United States Patent [19]

van Amerongen et al.

[11] 4,057,070

[45] Nov. 8, 1977

[54] CLEANING APPARATUS FOR MECHANICAL WORKPIECES

[75] Inventors: Evert van Amerongen, Bennekom; Willem M. Buhrman, Leusden, both of Netherlands

[73] Assignee: SKF Industrial Trading and Development Company B.V., Nieuwegein, Netherlands

[21] Appl. No.: 688,370

[22] Filed: May 20, 1976

[30] Foreign Application Priority Data

May 21, 1975  Netherlands .......................... 7505936

[51] Int. Cl.$^2$ ............................................. B08B 3/12
[52] U.S. Cl. ..................................... 134/83; 134/107; 134/184; 118/423; 118/429
[58] Field of Search ..................... 134/1, 83, 105, 107, 134/109, 165, 184, 49, 152, 166 R; 118/423, 429

[56] References Cited

U.S. PATENT DOCUMENTS

| | | | |
|---|---|---|---|
| 2,845,077 | 7/1958 | Branson | 134/1 X |
| 3,090,089 | 5/1963 | Emerson | 134/165 X |
| 3,099,584 | 7/1963 | Walsh | 134/1 |
| 3,308,839 | 3/1967 | Barday | 134/107 X |

FOREIGN PATENT DOCUMENTS 282,887  3/1971  U.S.S.R. ................................ 134/83

*Primary Examiner*—Robert L. Bleutge
*Attorney, Agent, or Firm*—Ervin B. Steinberg; Philip J. Feig

[57] ABSTRACT

A cleaning apparatus for cleaning mechanical workpieces, such as bearings, comprises a reservoir for containing a cleaning liquid, a stationary conveyor mechanism partially immersed in the cleaning liquid, and a high frequency vibration source disposed in proximity to and near the bottom of the reservoir. Responsive to the vibration source transmitting vibratory energy via a coupling medium to the cleaning liquid, the workpieces are simultaneously conveyed along the conveyor mechanism and cleansed in the cleaning liquid.

15 Claims, 4 Drawing Figures

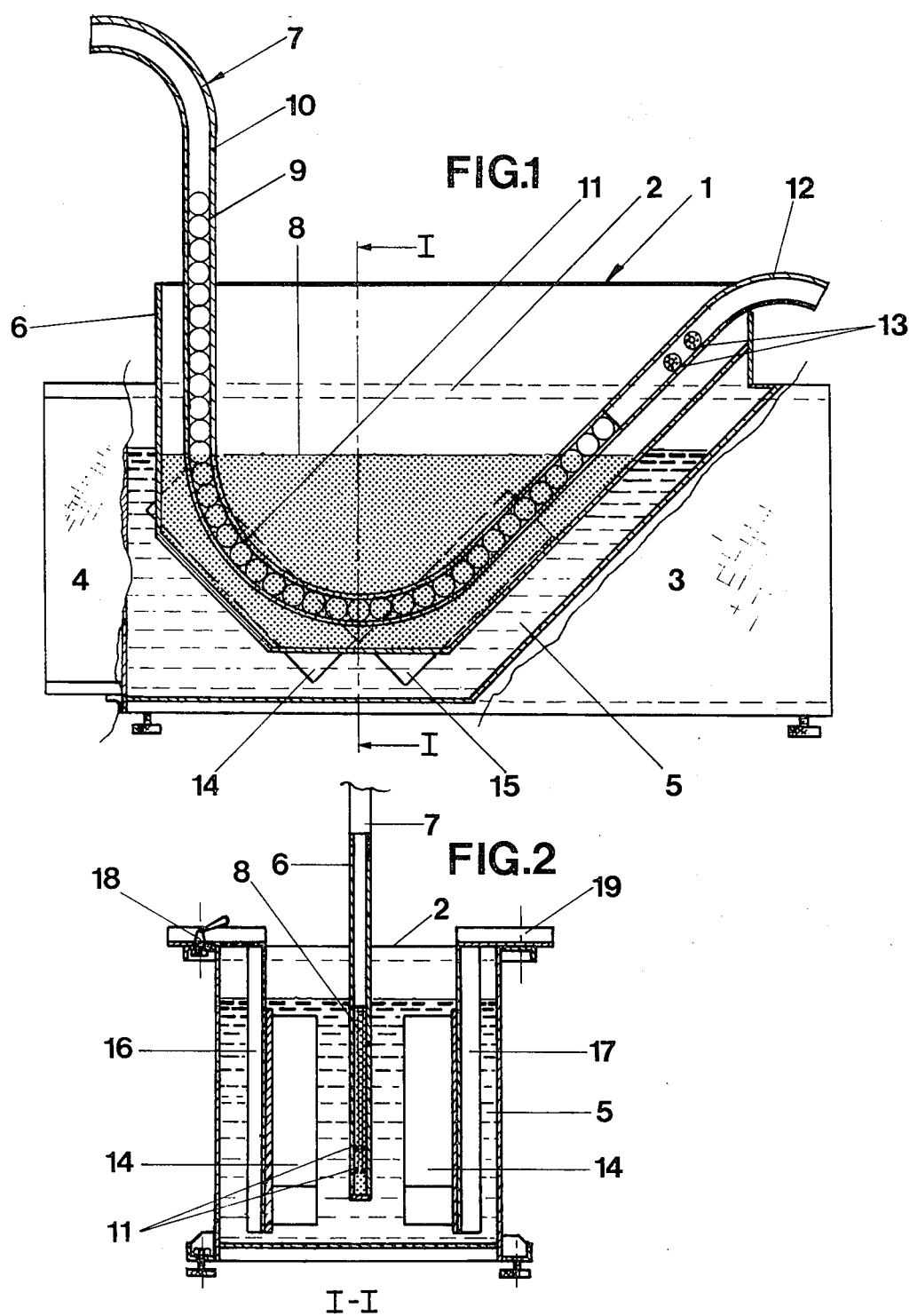

CLEANING APPARATUS FOR MECHANICAL WORKPIECES

BRIEF SUMMARY OF THE INVENTION

This invention relates to a cleaning apparatus for cleaning mechanical workpieces, such as bearings. The apparatus, more specifically, comprises a reservoir for containing a cleaning liquid, a stationary conveyor mechanism partially immersed in the cleaning liquid, and a high frequency vibration source disposed in proximity to the conveyor mechanism near the bottom of the reservoir. Responsive to imparting high frequency vibratory energy from the vibration source via a coupling medium to the cleaning liquid, the workpieces are conveyed along the conveyor mechanism while being cleaned in the liquid.

A prior art cleaning apparatus is disclosed, for example, in U.S. Pat. No. 2,845,077. In accordance with the prior apparatus the workpieces to be cleaned are disposed in trays which trays are then carried by a conveyor mechanism for a predetermined time through a predetermined distance in a horizontal direction through the cleaning liquid. Simultaneously, high frequency vibrations are transmitted by the vibration source into the cleaning fluid via a coupling medium such as water. By the appropriate selection of frequencies, typically in the frequency range of several tens of kilohertz, cavitation is developed in the cleaning liquid and the implosions exert a cleaning effect on the surface of the workpieces to be cleaned. In this connection it is wellknown that most mechanical workpieces, such as bearings, before they are transported from the manufacturing department to an inspection or packing department, first have to be cleaned of particles and residue, such as metal particles adhering to the surfaces of the workpieces, greasy substances, and the like, so that at the time of final inspection these particles and residue adhering to the workpieces will not cause a rejection of the workpieces.

The invention provides an improved cleaning apparatus of the type stated, which in accordance with the invention, is characterized in that at least one part of the conveyor mechanism is disposed close to or between one or more high frequency sources in such a manner that, with the aid of the cavitation developed in the cleaning solvent responsive to the vibration source and the influence of gravity, the workpieces are conveyed along a track comprising part of the conveyor mechanism. Thus, a simple conveyor mechanism for use in the cleaning apparatus is obtained, which in addition, requires little or virtually no additional space above and in the apparatus itself. Moreover, of great importance as has been found in practice and as will be further explained hereinafter is the fact that the cleaning of the workpieces is 4 to 5 times more effective than that which can be achieved with the apparatus available to date. This result is mainly due to a combination of the following factors:
 a. appropriate choice of the cleaning liquid and of the coupling liquid for transmitting the vibrations;
 b. application of a sufficiently high intensity of cavitation;
 c. depending on the wavelength of the vibrations, at least one section of the conveyor mechanism passes in close proximity to the vibration source; and
 d. the performance of the conveyor mechanism.

In a preferred embodiment of the cleaning apparatus, in accordance with the invention, the conveyor mechanism is stationary and a portion of the mechanism disposed in the cleaning medium is coupled to the high frequency vibration source.

As a result of the factors stated above, the improved cleaning effect is achieved in a favorable manner, namely that the workpieces can convey themselves along the conveyor track.

In German Pat. No. 1,129,030, a cleaning apparatus is disclosed in which the conveying of the workpieces is obtained due to vibrational effects. The workpieces are displaced by vibrating the conveying means as the result of coupling a vibrator to each conveyor. In contradistinction therewith and in accordance with the present invention cavitation developed in the cleaning liquid by a high frequency vibration source, causes both cleaning and motion of the workpieces.

The present invention will be better understood by reference to the following description when taken in conjunction with the accompanying drawings.

BRIEF DESCRIPTION OF THE DRAWINGS

FIG. 1 is an elevational view partly in section, of a cleaning apparatus in accordance with the invention;

FIG. 2 is a cross sectional view along line I — I of the apparatus in accordance with FIG. 1;

DESCRIPTION OF THE INVENTION

Figure 4:
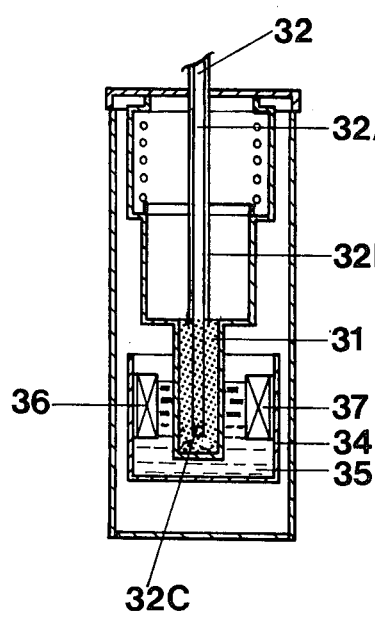
FIG. 4 is a view along the line III — III of the apparatus in accordance with FIG. 3.

The apparatus as shown in FIG. 1 comprises a tank 1 which is provided with a liquid compartment 2 together with two separate compartments 3 and 4. Compartment 3 is fitted with pumping and filtering means suitable for pumping and filtering different kinds of liquids, particularly cleaning solvents, while compartment 4 is provided with electrical equipment necessary for operation of the apparatus. Essential for the invention is the construction of compartment 2, which comprises a space filled with a liquid in which a second smaller reservoir 6 is disposed. The reservoir 6 contains a conveyor mechanism 7. The reservoir 6 filled with a cleaning liquid or solvent 8 separates the liquid 5 from the solvent 8. The liquid 5 furthermore has the function of transmitting the high frequency vibrations in an efficient manner from a vibration source to a chamber, in this case to reservoir 6. In accordance with one arrangement of the invention, a conveyor mechanism in the form of a guide channel 7 is disposed in reservoir 6, in which the workpieces to be cleaned, such as bearings 9 can be displaced. In this embodiment, the guide channel 7 comprises an end 10 which partially projects outside the compartment 2 and in the solvent 8 changes over to a so-called open portion 11 (see also FIG. 2) which is curved and ends in an inclined rising end portion 12, which lies at a lower level than the end 10. In portion 12 of the guide channel 7, a spraying device 13 is disposed which is suitable for spraying cleaning solvent 8 onto the components 9 as the latter leave the guide channel at exit 12. In proximity to the curved lower portion 11 of the guide channel 7, there are disposed high frequency vibration sources 14 and 15 operating suitably at a frequency in the range from 20 to 50 kHz. These vibration sources are placed in the liquid 5 contained in the reservoir 2. The liquid 5 comprises preferably water. Water has the favorable property of transmitting high frequency vibrations in an efficient manner from the vibration sources 14 and 15 to the reservoir 6 and to guide channel 7. The cavitation phenonmenon in the solvent 8 essential for the cleaning process of the workpieces is caused by the sources 14 and 15 as is well understood in the art of ultrasonic cleaning. A cleaning liquid 8 comprising so-called "White Spirit" with the addition preferably of one percent by volume of oil provides superior cleaning effect and at the same time prevents the corrosion of bearings, which are typical workpieces cleaned by the present apparatus.

FIG. 2 shows the vibration sources 14 and 15 disposed in the coupling liquid 5. The vibration sources 14 and 15 are coupled to location means 16 and 17, which means include adjusting mechanisms 18 and 19 for adjusting the position of vibration sources 14 and 15 with respect to the guide channel 7. Moreover, the figure shows that the curved portion 11 of the guide channel 7 is formed by strips which are fastened to the narrow reservoir 6.

The apparatus shown in FIGS. 1 and 2 operates as follows: The high frequency vibration sources 14 and 15 which in the preferred embodiment have an output in the ultrasonic frequency range between 25 and 40 kHz are immersed in the coupling liquid 5, preferably water. The cleaning solution 8 in the reservoir 6 is generally a known cleaning solvent. In a typical embodiment, the cleaning solvent comprises a mixture of "White Spirit" 15 and 4 percent mineral oil with which an optimum cleaning effect is obtained in the apparatus. As the workpieces, bearings 9, are conveyed to the bottom portion 11 of the guide channel 7, the energy provided by the vibration sources 14 and 15, which span the greater part of the open part of the guide channel 7, effects cleaning of the workpieces. The ultrasonic vibratory energy is transmitted from the sources 14 and 15 via the liquid 5 to the reservoir 6, guide channel 7, the cleaning solvent 8 and finally to the workpiece 9. The high intensity high frequency vibrations applied to the solvent cause cavitation, which phenomenon provides cleaning of the workpieces. In accordance with the present invention, solely as a result of the combined effect of the cavitation and the specific form of the conveyor mechanism 7, the workpieces therein travel along the guide channel 7 without external motive means. The workpieces urge each other into motion in the guide channel 7, along the guide portion 10 and along the bottom portion 11 where they are in contact with the solvent 8 towards the outlet portion 12 of the guide channel 7. During the travel of the workpieces in the guide portion 12, they are further cleaned by means of a spraying device 13, for removing contaminated solvent 8 residue so that clean workpieces are obtained which can be inspected and packaged without further processing. It is contemplated further that the cleaning apparatus comprises several cleaning reservoirs as shown in FIGS. 1 and 2 sequentially arranged; thereby, workpieces which are difficult to clean undergo the cleaning process several times and in so doing automatically travel through a series of guide channels thus formed.

Figure 3:
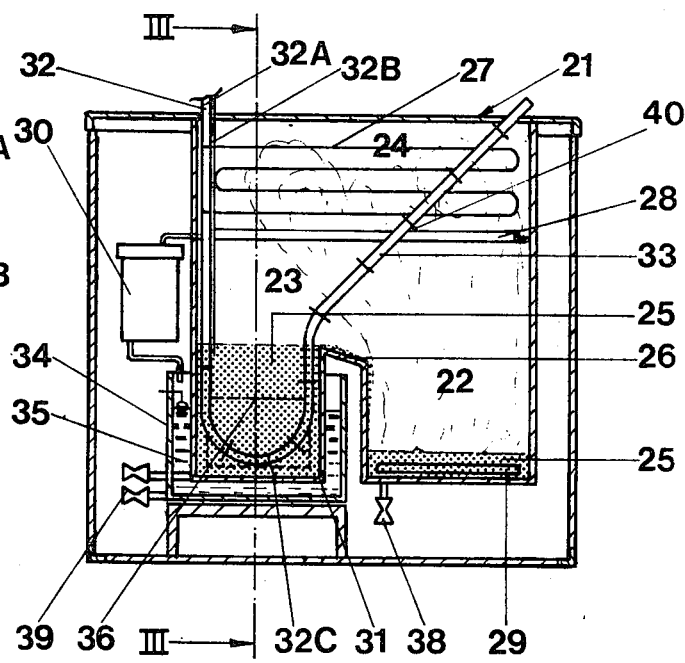
FIG. 3 likewise is a longitudinal section of a modified cleaning apparatus in accordance with the invention.

FIG. 3 shows a modified cleaning apparatus 21 having several compartments 22, 23 and 24 which are in communication with each other. The cleaning medium 25 is present in both the liquid and the vapor phase. Separation between the compartments is provided by an overflow partition 26 disposed between the compartments 22 and 23 and by a cooling region 24 comprising condensing coils 27 and a peripheral gutter 28.

Compartment 22 disposed beneath the upper edge of partition 26 contains a cleaning solvent 25, partly in liquid phase, which by means of a heating coil 29 is maintained at an elevated temperature so that a vapor phase of cleaning solvent is present in the upper portion of compartment 22 and compartment 23. In the upper portion of compartment 22 there is provided a vapor condensing region 24 which is shown diagrammatically by the condensing coils 27 and gutter 28. The vapor from the cleaning solvent 25 condenses in the region 24, after which the condensate is returned via the gutter 28 to a water separator 30 and thence to reservoir 31. The reservoir 31 is fitted with a conveying means 32 of approximately the same configuration as shown by numeral 7 in FIGS. 1 and 2. Except for the conveying means 32, the construction illustrated and described in FIG. 3 is that of a conventional vapor degreaser.

A distinction between the present embodiment and the embodiment per FIGS. 1 and 2 resides in the fact that the guide channel 32, particularly the portion 32C projecting into the reservoir 31 up to the end of the inclined rising part 33, is completely "open", except for the portion 32A which comprises a closed vertically disposed tube 32B reaching nearly to the level of the cleaning solvent 25 contained in the reservoir 31. By virtue of closed tubing 32B which shields the workpieces the so-called vapor rinsing of the workpieces which could have a detrimental effect on the cleaning process is inhibited from occurring prior to the ultrasonic cleaning. Moreover, substantially no workpieces fall out of the channel in the region 32A of the guide channel 32.

In this manner workpieces disposed in the channel 32 are urged to traverse through the different phases of the cleaning medium, whereby an optimum cleaning effect is obtained. Another distinction from the embodiment of the apparatus illustrated in FIGS. 1 and 2 resides in the fact that the guide channel 32 is disposed in a larger reservoir 31, that is, it is a separate entity from the reservoir 31 (see FIG. 4). The reservoir 31 in this arrangement is disposed in a further reservoir 34 which is filled with water 35 and includes high frequency vibration sources 36 and 37. The vibration sources 36 and 37, as before, span the greater part of the curved guide portion 32C. The apparatus 21 is provided with a pump and filter installation (not shown), a drain system 38 and 39, and electrical equipment necessary to provide proper operation of the apparatus. In the arrangement per FIG. 3 the guide channel portion 33 is fastened via adjustable attaching means, such as clamps or plates 40, to the cleaning apparatus 21, to cause the position of the guide channel portion 33 to be rendered adjustable relative to the curved guide channel portion 32C.

As clearly seen in FIG. 4, the conveying means, that is the guide channel 32, is disposed in a relatively large reservoir 31 and thus is disposed separate from the reservoir 31, unlike the guide channel 7 in FIGS. 1 and 2. Further, in the present construction, the high frequency vibration sources 36 and 37 are adjustable relative to the reservoir 31, so that, in addition to the cavitation phenomenon, the rate of travel of the workpieces along the conveying means can be varied also by this adjustment.

Operation of the apparatus in accordance with FIGS. 3 and 4 coincides broadly with that of the apparatus per FIGS. 1 and 2. In the apparatus per FIGS. 3 and 4, the workpieces urge themselves into motion along the channel 32 due to the action of the high frequency vibration sources 36 and 37, with the cleaning process occurring concurrently. The cleaning action occurs along channel portion 32C when the workpieces are disposed in the cleaning liquid and finally at the end portion 33 which is disposed in the vapor rinse and cooling zone 24. In this manner a high degree of cleaning is attained. Moreover, in the embodiment per FIGS. 3 and 4, the cleaned workpieces leave the apparatus 21 almost completely dry and free from residue, so that for example, a simple visual inspection of workpieces cleaned in the apparatus is sufficient.

The invention, however, is not restricted to the embodiments of the cleaning apparatus shown herein, but within the concept of the invention are those cleaning apparatus in which the workpieces to be cleaned displace themselves through the cleaning process by the effect of the high frequency vibration source and the cavitation phenomenon resulting therefrom.

What is claimed is:

1. A cleaning apparatus comprising:
   a reservoir adapted to contain a solvent for cleaning workpieces;
   a coupling liquid disposed in contact with said reservoir at the exterior thereof;
   conveying means arranged to cause a portion thereof to be disposed in said reservoir for contact with said solvent and causing workpieces supported by said portion to be exposed to said solvent;
   a source of high frequency vibratory energy disposed in proximity to the bottom of said reservoir and said portion of said conveying means, said source adapted when energized to impart high frequency vibrations via said coupling liquid to said reservoir and the solvent to cause cavitation in said solvent, and
   said conveying means being shaped to cause workpieces supported on said conveying means to advance themselves along said conveying means responsive solely to the combined action of gravity and cavitation produced in said solvent.

2. An apparatus as set forth in claim 1, said conveying means being stationary, and said source of vibratory energy being in juxtaposition with said portion contacting said solvent.

3. An apparatus as set forth in claim 1, said conveying means comprising two ascending end portions and a connecting intermediate curved portion contacting said solvent.

4. An apparatus as set forth in claim 3, one of the ascending portions comprising the workpiece exit portion including solvent spray means.

5. An apparatus as set forth in claim 1, said portion of said conveying means comprising a guide channel which is substantially open along its length in contact with said solvent to expose workpieces supported by said guide channel to said solvent.

6. An apparatus as set forth in claim 5, said channel forming a part of said reservoir which is relatively narrow.

7. An apparatus as set forth in claim 6, said reservoir being disposed in a compartment which houses said coupling liquid.

8. An apparatus as set forth in claim 1, said reservoir being a separate entity and movable relative to said coupling liquid.

9. An apparatus as set forth in claim 1, and means disposed for adjusting the position of said source of vibratory energy relative to said conveying means.

10. An apparatus as set forth in claim 1, said reservoir having three compartments, one compartment containing the coupling liquid, another compartment containing a cleaning solvent which can be brought to an elevated temperature and a third compartment containing the cleaning solvent in liquid form condensed from a vapor zone and a condensing region disposed above said second and third compartments, said conveying means having said portion in contact with said solvent in said third compartment.

11. An apparatus as set forth in claim 10, said conveying means having another portion disposed in said vapor zone and in said condensing region to cause workpieces to be successively exposed to said solvent in its liquid phase in said third compartment, said solvent in its vapor phase in said vapor zone and to said condensing region.

12. An apparatus as set forth in claim 11, said conveying means having an inlet portion for feeding workpieces to said solvent in said third compartment, and shielding means covering said inlet portion for inhibiting from exposure of the workpieces to solvent vapor prior to being cleaned in said third compartment.

13. An apparatus as set forth in claim 1, said source providing energy at a predetermined frequency in the range of from 20 to 50 kHz.

14. An apparatus as set forth in claim 1, said coupling liquid being water.

15. An apparatus as set forth in claim 1, said source of energy comprising at least two spaced sources, and said portion of said conveying means being disposed in the space between said sources.

* * * * *